United States Patent
Braudes et al.

(10) Patent No.: US 10,110,560 B2
(45) Date of Patent: Oct. 23, 2018

(54) MANAGEMENT FOR COMMUNICATION PORTS

(71) Applicant: Avaya Inc., Santa Clara, CA (US)

(72) Inventors: Robert Braudes, Erie, CO (US); Benny J. Ellis, Denver, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/872,884

(22) Filed: Oct. 1, 2015

(65) Prior Publication Data

US 2017/0041289 A1    Feb. 9, 2017

Related U.S. Application Data

(60) Provisional application No. 62/202,249, filed on Aug. 7, 2015.

(51) Int. Cl.
  *H04L 29/06* (2006.01)
  *G06F 8/61* (2018.01)
  *G06F 21/85* (2013.01)

(52) U.S. Cl.
  CPC ............ *H04L 63/0236* (2013.01); *G06F 8/62* (2013.01); *G06F 21/85* (2013.01); *H04L 63/0263* (2013.01); *H04L 63/1408* (2013.01); *G06F 8/61* (2013.01); *G06F 2221/2141* (2013.01)

(58) Field of Classification Search
  CPC .................................................. H04L 63/0236
  See application file for complete search history.

(56) References Cited

U.S. PATENT DOCUMENTS

| | | | | |
|---|---|---|---|---|
| 5,867,662 A | * | 2/1999 | Riggs ................. | G06F 9/45537 709/228 |
| 6,651,174 B1 | * | 11/2003 | Nagaoka ............. | H04L 63/0263 709/239 |
| 7,805,629 B2 | * | 9/2010 | Insley ...................... | H04L 1/08 709/219 |
| 7,921,335 B2 | * | 4/2011 | Kiefer ................. | G06F 11/2294 714/25 |

(Continued)

OTHER PUBLICATIONS

Payne et al.; Architecture and applications for a distributed embedded firewall; Published in: Computer Security Applications Conference, 2001. ACSAC 2001. Proceedings 17th Annual; IEEE Xplore; (Year: 2001).*

(Continued)

*Primary Examiner* — Bradley Holder
(74) *Attorney, Agent, or Firm* — Sheridan Ross P.C.

(57) ABSTRACT

When an application is installed, a list of one or more communication ports used by the application is received. In addition, a list of communication ports that are currently open in a firewall is received. The two lists are compared to determine if there is a conflict. In response to finding a conflict, a control port option is taken. For example, a control port option may be: 1) where a port management window is displayed that allows the administrator to change the list of one or more communication ports and/or the list of communication ports currently in use, 2) where an auto configuration option window is displayed, or 3) where open communication ports are automatically selected to resolve the conflict. If a conflict is not found, a message is sent to a firewall to automatically open the one or more communication ports for the application.

20 Claims, 6 Drawing Sheets

(56) References Cited

U.S. PATENT DOCUMENTS

| | | | | |
|---|---|---|---|---|
| 7,945,676 | B2* | 5/2011 | Kaczmarski | H04L 63/08 709/227 |
| 8,381,209 | B2* | 2/2013 | Reumann | H04L 63/0263 709/250 |
| 8,407,777 | B1* | 3/2013 | John | H04L 63/029 726/11 |
| 8,510,376 | B2* | 8/2013 | Kaczmarski | H04L 63/08 709/203 |
| 8,516,191 | B2* | 8/2013 | Matsuki | G06F 3/0607 709/224 |
| 8,661,434 | B1* | 2/2014 | Liang | G06F 9/45558 709/220 |
| 8,776,059 | B2* | 7/2014 | Reumann | G06F 9/5077 709/250 |
| 9,438,618 | B1* | 9/2016 | Sultan | H04L 63/1433 |
| 2002/0019862 | A1* | 2/2002 | Borrett | H04L 41/0206 709/221 |
| 2002/0078377 | A1* | 6/2002 | Chang | H04L 63/0218 726/13 |
| 2006/0206614 | A1* | 9/2006 | Kaczmarski | H04L 63/08 709/228 |
| 2008/0089494 | A1* | 4/2008 | Kaas | H04L 41/28 379/93.02 |
| 2008/0155647 | A1* | 6/2008 | Miyawaki | H04L 63/0227 726/1 |
| 2008/0163207 | A1* | 7/2008 | Reumann | H04L 63/0263 718/1 |
| 2009/0074003 | A1* | 3/2009 | Accapadi | H04L 63/029 370/448 |
| 2010/0269172 | A1* | 10/2010 | Xie | H04L 63/029 726/14 |
| 2011/0161412 | A1* | 6/2011 | Kaczmarski | H04L 63/08 709/203 |
| 2012/0011509 | A1* | 1/2012 | Husain | G06F 9/5088 718/1 |
| 2012/0159235 | A1* | 6/2012 | Suganthi | G06F 11/2028 714/4.11 |
| 2013/0061224 | A1* | 3/2013 | Reumann | H04L 63/0263 718/1 |
| 2013/0091538 | A1* | 4/2013 | Chirra | H04L 63/0263 726/1 |
| 2013/0144935 | A1* | 6/2013 | Valdetaro | H04L 63/0281 709/203 |
| 2013/0198395 | A1* | 8/2013 | John | H04L 63/029 709/227 |
| 2013/0268584 | A1* | 10/2013 | Desai | H04L 29/06047 709/203 |
| 2014/0068599 | A1* | 3/2014 | Kannan | G06F 8/61 718/1 |
| 2016/0337185 | A1* | 11/2016 | Hardison | H04L 41/0813 |

OTHER PUBLICATIONS

Mansmann et al.; Visual analysis of complex firewall configurations; Published in: Proceeding VizSec '12 Proceedings of the Ninth International Symposium on Visualization for Cyber Security; pp. 1-8; Seattle, Washington, USA—Oct. 15, 2012; ACM Digital Library; (Year: 2012).*

* cited by examiner

MANAGEMENT FOR COMMUNICATION PORTS

CROSS REFERENCE TO RELATED APPLICATIONS

This application claims the benefit under 35 U.S.C. § 119(e) of U.S. Provisional Application No. 62/202,249, filed Aug. 7, 2015, entitled "PORT FLEXIBILITY FOR PLUG-INS," the entire disclosure of which is incorporated herein by reference.

TECHNICAL FIELD

The systems and methods disclosed herein relate to communication system and in particular to management of communication systems using firewalls.

BACKGROUND

When an application is developed that uses communication ports (e.g. Internet Protocol (IP) ports), the application will typically use one or more predefined communication ports. If the predefined communication ports are already in use or are configured to not be enabled (e.g., by the firewall), an administrator will typically have to go and change the communication port information in the firewall. For example, in Linux™, the administrator will have to go and change the communication port information in an IP Tables file and in a configuration file in order for the application to communicate properly on the network.

BRIEF SUMMARY

Systems and methods are provided to solve these and other problems and disadvantages of the prior art. When an application is installed, a list of one or more communication ports used by the application is received. In addition, a list of communication ports that are currently open in a firewall is received. The two lists are compared to determine if there is a conflict. In response to finding a conflict, a control port option is taken. For example, a control port option may be: 1) where a port management window is displayed that allows the administrator to change the list of one or more communication ports and/or the list of communication ports currently in use, 2) where an auto configuration option window is displayed, or 3) where open communication ports are automatically selected to resolve the conflict. If a conflict is not found, a message is sent to a firewall to automatically open the one or more communication ports for the application.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

DETAILED DESCRIPTION

Figure 1:
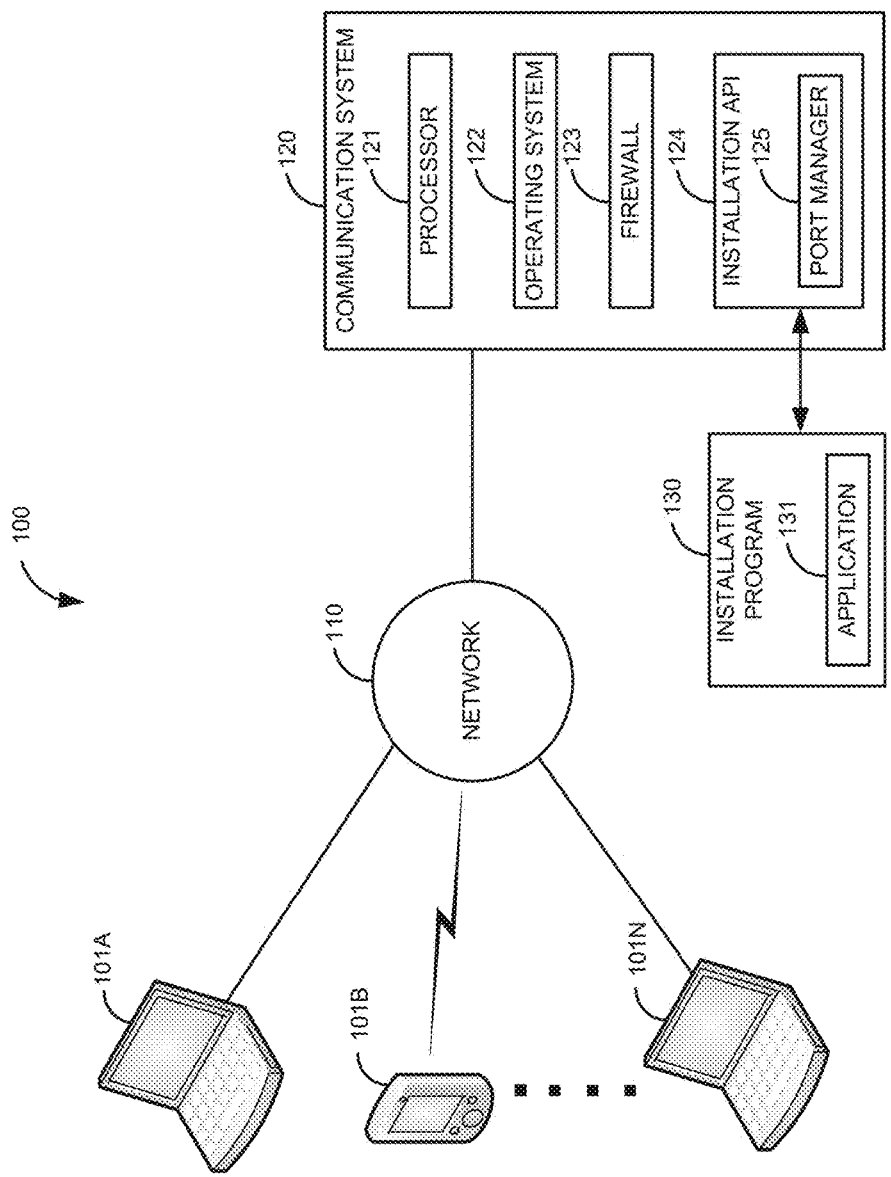
FIG. 1 is a block diagram of a first illustrative system for managing communication ports used by an application.

FIG. 1 is a block diagram of a first illustrative system 100 for managing communication ports used by an application 131. The first illustrative system comprises communication devices 101A-101N, a communication system 120 and an installation program 130.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication devices 101A-101N may be connected to the network 110, including only a single communication device 101. In addition, the communication device 101 may be directly connected to the communication system 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The communication system 120 can be, or may include any hardware coupled with software that can communicate on the network 110, such as, a server, a Private Branch Exchange (PBX), a web server, a communication server, a telephone system, a video server, an application server, a work station, a Personal Computer, (PC), and/or the like. The communication system 120 further comprises a processor 121, an operating system 122, a firewall 123, and an installation Application Programming Interface (API) 124.

The processor 121 can be or may include any hardware processor, such as a microprocessor, a Digital Signaling Processor (DSP), an application specific processor, a microcontroller, and/or the like. The operating system 122 can be or may include any operating system 122 that can provide basic operating system features, such as Unix, Linux, Microsoft Windows®, Mac OS®, OS X™, Google Chromium™, iOS®, Android™, a single user operating system, a multi-user operating system, a proprietary operating system, and/or the like.

The firewall 123 can be or may include any hardware/software that can be used to manage communication ports. For example, the firewall 123 can be Linux IP tables, Norton Internet Security™, ZoneAlarm™, TinyWall™, Comodo™, a session border controller, a Network Address Translator (NAT), and/or the like. One purpose of the firewall 123 is to control which communication ports are opened and closed in order to provide security for the communication system 120. A communication port is identifier that is used to identify a communication session with a particular application 131. For example, web servers (application 131) use the IP communication port 80 for Hyper Text Transfer Protocol (HTTP). File Transfer Protocol (FTP) applications use the IP communication port 20. The communication port can be based on both connection oriented protocols (e.g., Transmission Control Protocol (TCP)) or based on datagram protocols (e.g., User Datagram Protocol (UDP)). The descriptions provided herein are based on the Internet Protocol (IP). However, the scope of the embodiments described herein are not limited to IP based protocols. The firewall 123 is shown as part of the communication system 120. However, in some embodiments, the firewall 123 may be external to the communication system 120, such as shown in FIG. 2.

The installation Application Programming Interface (API) 124 can be or may include any type of programming interface that is called to manage communication ports. The installation API 124 further comprises a port manager 125. The port manager 125 is a software module that, based on the API calls made, can interface with the firewall 123 in order to set/close the communication ports on the firewall 123.

The installation program 130 can be or may include any software that is used to install an application 131. The application 131 can be any application, software module, plug-in, and/or the like that can be installed onto the communication system 120. For example, the installation program 130 may be an installation program to install a web server (application 131) that uses the IP communication port 80 for Hyper Text Transfer Protocol (HTTP). The application 131 may be a plug-in or application 131 that uses APIs of the operating system 122 and/or the installation API 124.

Figure 2:
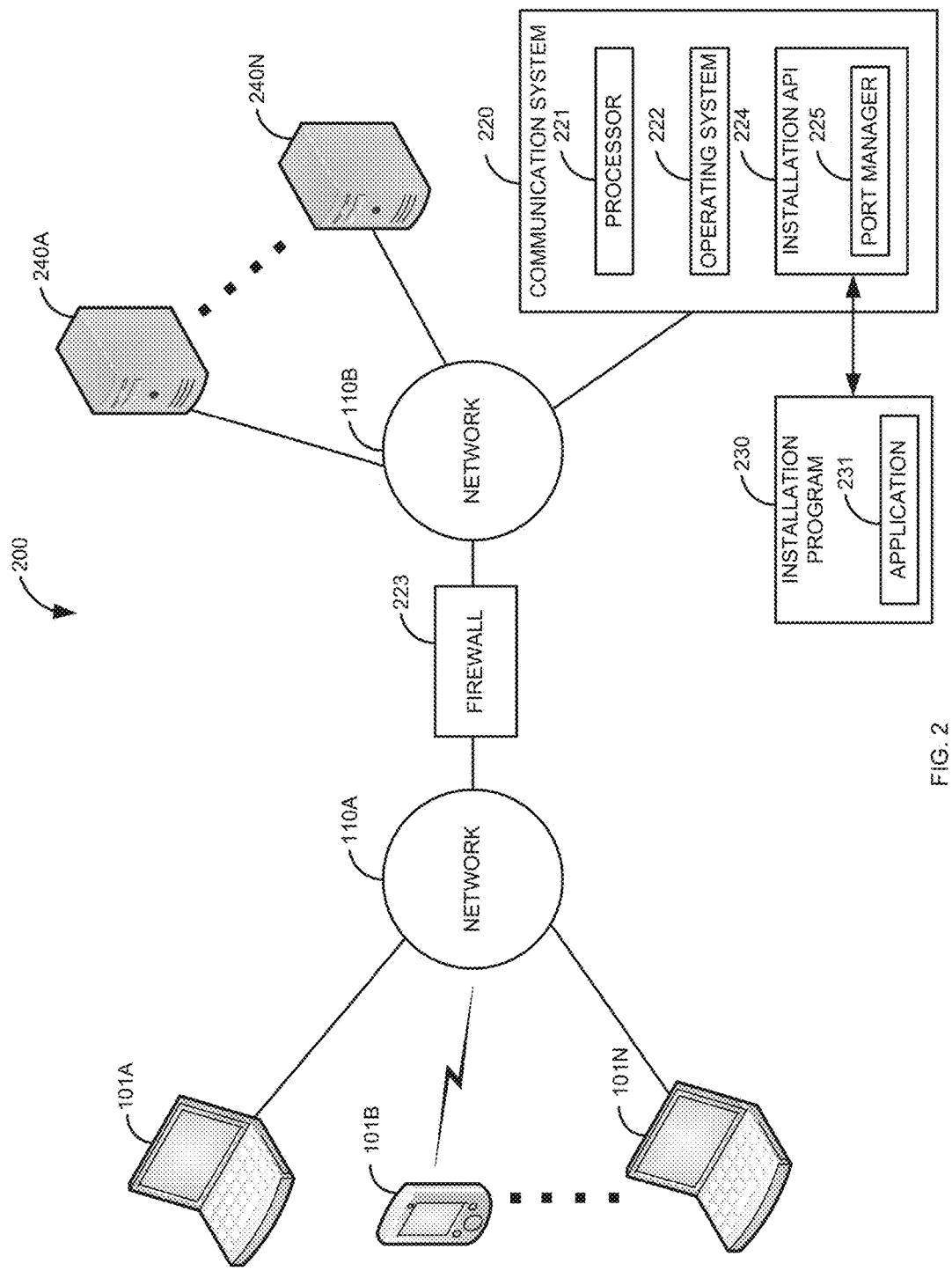
FIG. 2 is a block diagram of a second illustrative system for managing communication ports for a cluster of servers.

FIG. 2 is a block diagram of a second illustrative system 200 for managing communication ports for a cluster of servers 240A-240N. The second illustrative system 200 comprises the communication devices 101A-101N, networks 110A-110B, a firewall 223, a communication system 220, an installation program 230, and the cluster of servers 240A-240N.

The networks 110A-110B are two different networks 110 that are separated by the firewall 223. For example, the network 110A may be the Internet and the network 110B may be a corporate or enterprise network.

The communication system 220 further comprises a processor 221, an operating system 222, and an installation API 224. The processor 221 may be the same or different from the processor 121. The operating system 222 may the same as or different from the operating system 122.

The firewall 223 performs similar functions to the firewall 123. However, the firewall 223 may perform firewall services for each server 240 of the cluster of servers 240A-240N and/or the communication system 220. For example, the firewall 223 may be administered to open communication ports for one or more application(s) 231 on each server 240 of the cluster of servers 240A-240N and/or the communication system 220.

The installation API 224 may be the same or different from the installation API 124. The installation API 224 further comprises a port manager 225. The port manager 225 may be the same or different from the port manager 124. The installation API 224/port manager 225 may also be included in one or more (or all) of the servers 240 in the cluster of servers 240A-240N.

The installation program 230 may the similar or different from the installation program 130. The installation program 230 further comprises an application 231. The application 231 may be the same or different from the application 131. In some embodiments, the application 231 is an enterprise or cloud version of the application 131. FIG. 2 shows the application 231 being installed to the communication system 220. In other embodiments, the installation program 230 may be installed directly to any one or all of the servers 240 in the cluster of servers 240A-240N. In some embodiments, the installation program 230 is designed to use the installation API 224 to install the application 231 to each server 240 in the cluster of servers 240A-240N (i.e., a cluster installation program 230).

The servers 240 in the cluster of servers 240A-240N can be or may include any hardware coupled with firmware/software that can provide communication services to the communication devices 101A-101N. For example, the cluster of servers 240A-240N may be a cluster of communication systems 220, a cluster of PBXs, a cluster of application servers, a cluster communication mangers, a cluster of video servers, a cluster of web servers, and/or the like. The cluster of servers 240A-240N may include the communication system 220. The cluster of servers 240A-240N can provide multiple services via multiple different applications 231. For example, the cluster of servers 240A-240N may provide web services and voice communication services.

Figure 3:
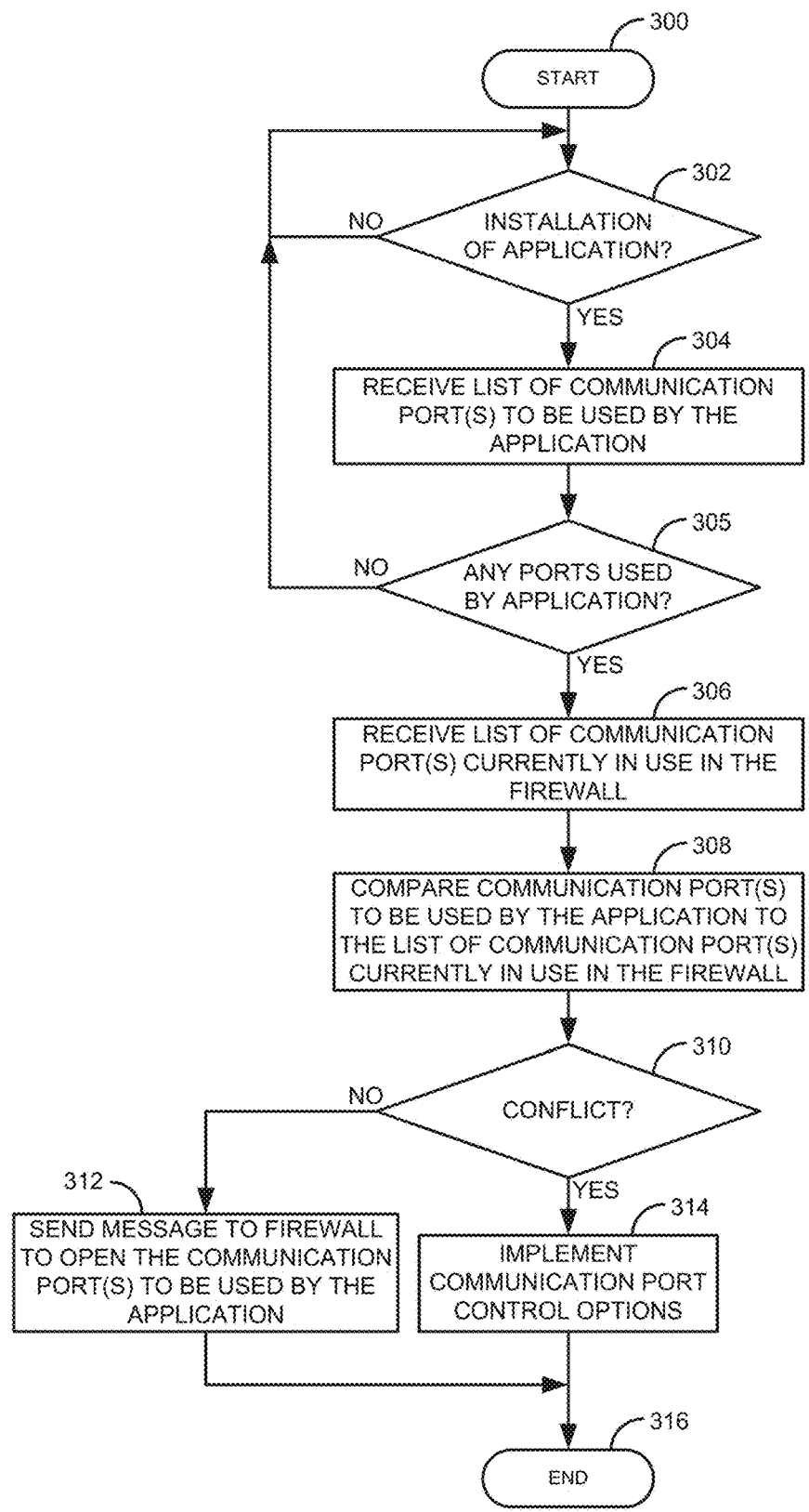
FIG. 3 is a flow diagram of a process for managing communication ports used by an application.

FIG. 3 is a flow diagram of a process for managing communication ports used by an application 131. Illustratively, communication devices 101A-101N, the communication systems 120/220, the processors 121/221, the operating systems 122/222, the firewalls 123/223, the installation APIs 124/224, the port managers 125/225, the installation programs 130/230, the applications 131/231, and the cluster of servers 240A-240N are stored-program-controlled entities, such as a computer or processor, which performs the method of FIGS. 3-6 and the processes described herein by executing program instructions stored in a computer readable storage medium, such as a memory or disk. Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

The process starts in step 300. The installation API 124 determines, in step 302, if the installation program 130 is installing an application 131. The installation API 124 can determine that the application 131 is being installed in various ways, such as based on a call to the installation API 124 by the installation program 130 or installation program 131. If the installation program 130 is not installing an application 131 in step 302, the process of step 302 repeats.

Otherwise, if the installation API 124 determines, in step 302, that the installation program 130 is installing the application 131, the installation API 124 receives a list of communication port(s) to be used by the application 131 in step 304. For example, the installation program 130 can make an API call and provide the list of communication port(s) to the installation API 124 in step 304. Alternatively, the list of communication ports may come from the application 131, such as in a configuration file of the application 131. The list of communication port(s) may include one or more communication ports. The list of communication ports may include one or more communication ports to receive messages and one or more communication ports to send messages. The communication ports to send and receive messages may be different communication ports.

If there are not any ports used by the application 131 in step 305, the process goes back to step 302. Otherwise, if there are ports being used by the application 131 in step 305, the process goes to step 306 where the port manager 125 receives a list of the communication port(s) currently in use by the firewall 123. The list of communication port(s) currently in use may be any number of communication ports, including zero communication ports. The port manager 125 can receive the list of communication port(s) currently in use by the firewall 123 in various ways. For example, the port manager 125 may send an iptables command to get a list of communication port(s) currently in use in by the firewall 123 in Linux™. If the firewall 123 is located external to the communication system 120, the port manager 125 may setup a connection (e.g., a TCP connection) to the firewall 123 to receive the list of communication port(s) currently in use by the firewall 123.

The port manager 125 compares, in step 308, the communication port(s) to be used by the application 131 to the list of communication port(s) currently in use by the firewall 123 to determine if there is a conflict. A conflict is where a communication port (or ports) to be used by the application 131 is already in use by another application(s) 131 and/or processes. If there is not a conflict in step 310, the port manager 125 sends a message to the firewall 123 to open the communication port(s) to be used by the application 131 in step 312 and the process ends in step 316. Otherwise, if there is a conflict in step 310, the port manager 125 implements one or more communication port control options in step 314. For example, a communication port control option may be to display the conflict to an administrator and have the administrator resolve the conflict. The process then ends in step 316.

To illustrate, consider the following example. An administrator starts the installation process by using the installation program 130 to install a web server (application 131) onto the communication system 120 (step 302). The installation program 130 for the web server sends a list of communication ports, which are received by the installation API 124 (step 304). In this example, the list is for TCP port 80 and UDP port 80 (HTTP ports). The port manager 125 receives the list of communication port(s) currently in use by the firewall 123, which are communication ports 1-10 and 200-204 (step 306). The port manager 125 compares the two lists (step 308) and determines that there is not a conflict (step 310). The port manager 125 sends a message to the firewall 123 to open the TCP port 80 and the UDP port 80 for the web server 131 (step 312). The communication devices 101A-101N can now communicate with the web server application 131 using the two opened ports (TCP port 80 and UDP port 80) to view web pages on the communication system 120.

Figure 4:
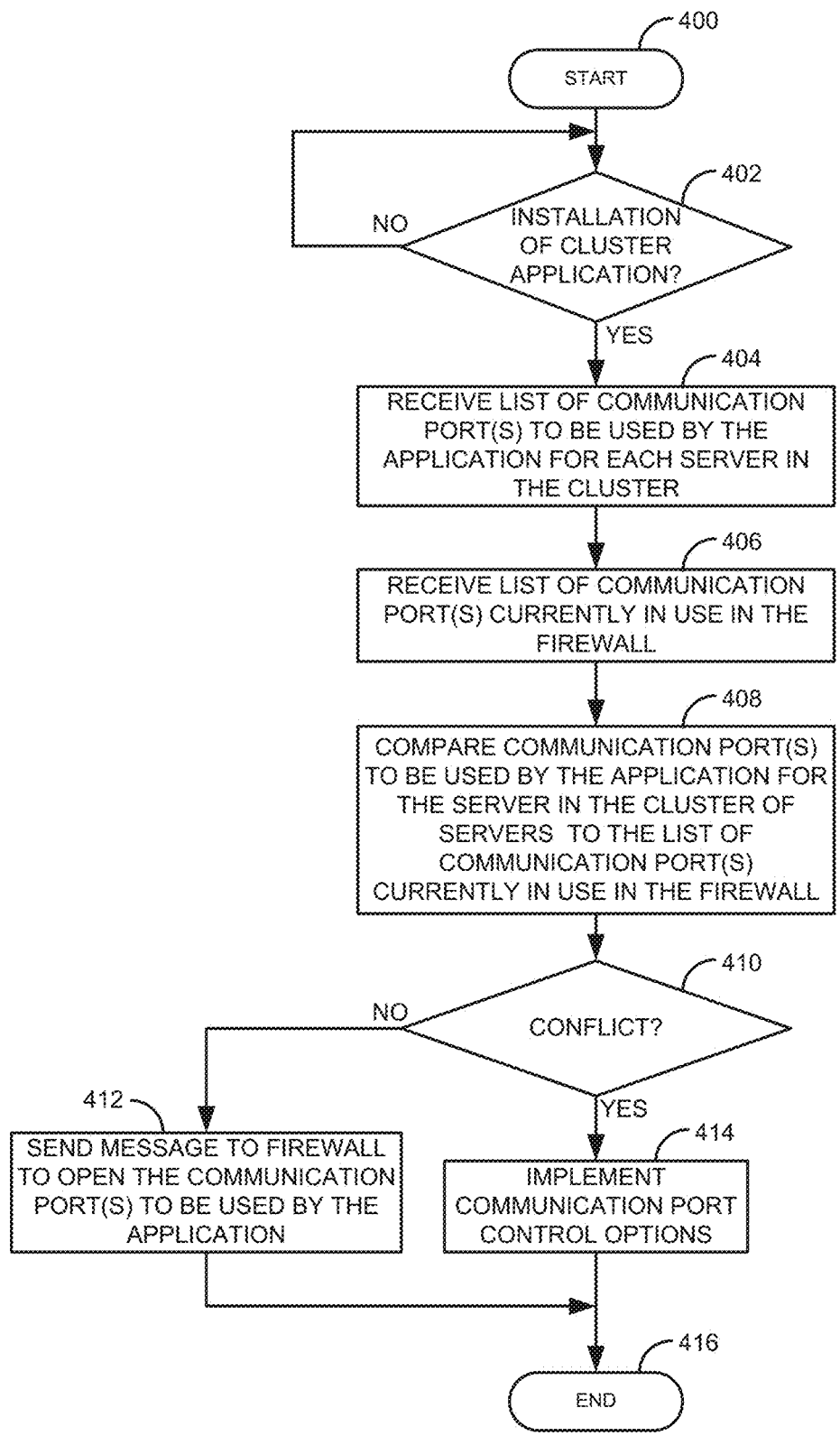
FIG. 4 is a flow diagram of a process for managing communication ports for a cluster of servers.

FIG. 4 is a flow diagram of a process for managing communication ports for a cluster of servers 240A-240N. The process starts in step 400. The installation API 224 determines, in step 402, if the installation program 230 is installing an application 231 to a cluster of servers 240A-240N. The installation program 230 can install multiple instances of the application 231 to the cluster of servers 240A-240N in various ways. For example, the installation program 230 may be used to install the application 231 on one of the servers 240 of the cluster of servers 240A-240N. The installed server 240 then installs instances of the application 231 to the rest of the servers in 240 in the cluster of servers 240A-240N. If the installation program 230 is not installing the application 231 in step 402, the process of step 402 repeats.

Otherwise, if the installation API 224 determines, in step 402, that the installation program 230 is installing the application 231 to the cluster of servers 240A-240N, the installation API 224 receives a list of communication port(s) to be used by the application 231 for each server 240 in the cluster of servers 240A-240N in step 404. For example, if the cluster of servers 240A-240N comprises three servers 240, each using two communication ports, the list of communication ports would be six communication ports. The list of communication ports may be provided by the installation program 230 or individually by each of the servers 240 in the cluster of servers 240A-240N. Alternatively, the list of communication ports may come from the application 231, such as in a configuration file for the application 231. The list of communication port(s) for each server 240 may include one or more communication ports. The list of communication ports for each server 240 may include one or more communication ports to receive messages and one or more communication ports to send messages. The communication ports to send and receive messages may be different communication ports.

The port manager 225 receives a list of the communication port(s) currently in use by the firewall 223 in step 406. The list of communication port(s) currently in use may be any number of communication ports, including zero communication ports. The port manager 225 can receive the list of communication port(s) currently in use by the firewall 223 in various ways. For example, the port manager 225 may setup a connection (e.g., a UDP connection) to the firewall 223 to receive the list of communication port(s) currently in use by the firewall 223.

The port manager 225 compares, in step 408, the communication port(s) to be used by the application 231 for the servers 240 in the cluster of servers 240A-240N to the list of communication port(s) currently in use by the firewall 223 to determine if there is a conflict. A conflict is where a communication port (or ports) to be used by the application 231 for the servers 240 of the cluster of servers 240A-240N are already in use by another application(s) 231 or processes.

If there is not a conflict in step 410, the port manager 225 sends a message to the firewall 223 to open the communication port(s) to be used by the application 231 for the servers 240 in the cluster of servers 240A-240N in step 412 and the process ends in step 416. Otherwise, if there is a conflict in step 410, the port manager 225 implements one or more communication port control options in step 414. For example, a communication port control option may be to display the conflict to an administrator and have the administrator resolve the conflict. The process then ends in step 416.

To illustrate, consider the following example. The communication system 220 is a server 240 that is part of the cluster of servers 240A-240N; the cluster of servers 240A-240N comprises three servers 240. An administrator starts the installation process by using the installation program 230 to install instances of a SIP communication application (application 231) onto the cluster of servers 240A-240N (step 402). As part of the installation process, the installation program 230 for the SIP communication application 231 sends a list of communication ports for each of the servers 240 in the cluster of servers 240A-240N, which are received by the installation API 224 (step 404). In this example, the list is for TCP/UDP ports 5060/5061 for the first server 240A, 5062/5063 for the second server 240B, and 5064/5065 for the third server 240N. The total number of requested communication ports is twelve communication ports (6 UDP ports 5060-5066 and 6 TCP ports 5060-5066). The port manager 225 receives the list of communication port(s) currently in use by the firewall 223, which are communication ports 1-10 and 200-204 (step 406). The port manager 225 compares the two lists (step 308) and determines that there is not a conflict (step 310). The port manager 225 sends a message to the firewall 223 to open the 6 UDP ports 5060-5066 and 6 TCP ports 5060-5066 for the SIP communication application 231 (step 412). The SIP communication applications 231 in the three servers 240A-240N can now start using their respective communication ports without any administrative intervention.

Figure 5:
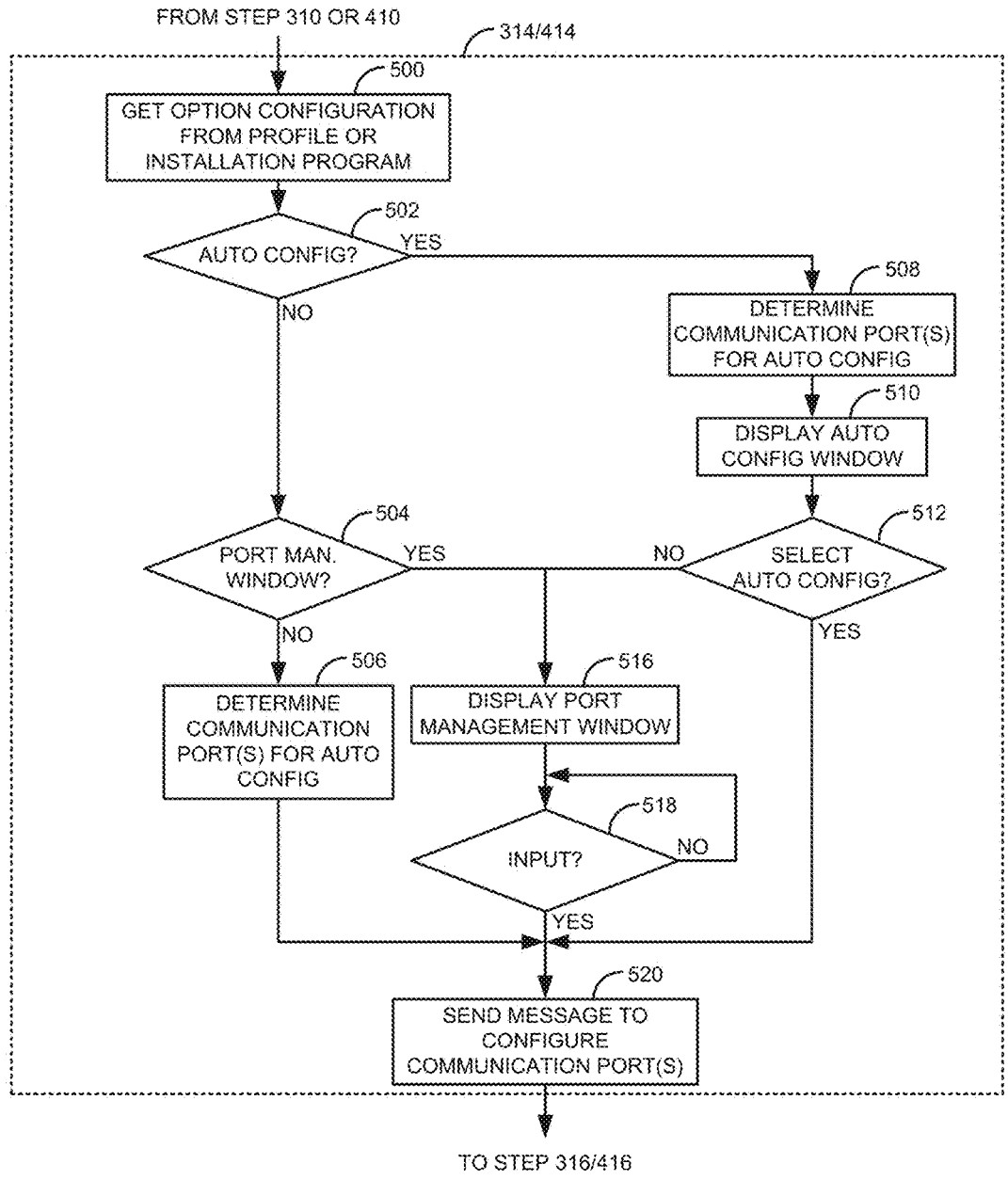
FIG. 5 is a flow diagram of a process for selecting different control options for managing communication ports.

FIG. 5 is a flow diagram of a process for selecting different control options for managing communication ports. The process of FIG. 5 is an expanded view of steps 314 or 414. In other words, the process of FIG. 5 works with either of the processes described in FIGS. 3 and 4.

After determining that there was a conflict in step 310 or 410, the port manager 125/225 gets option configuration information from a profile or from the installation program 130/230 in step 500. The profile can be a file that is administered (or defined by default) to determine which specific options will be implemented. For example, the profile may indicate that for all options where there is a conflict, the administrator will control which communication ports are assigned to the application 131/231 (see step 516).

Alternatively, the installation program 130/230 can provide which options will be taken. For example, the installation program 130/230 can make an API call to the installation API 124/224 to indicate that the auto configure option is first displayed to the administrator (see step 508).

The port manager 125/225 determines if the auto configure option is enabled in step 502. The auto configure option is to allow the port manager 125/225 to automatically select communication ports based on what communication ports are currently open, closed, unused, reserved, blocked from use, and/or the like. The auto configure option automatically resolves any conflicts between communication ports.

If the auto configure option is not enabled in step 502, the port manager 125/225 determines if the port management window should be displayed in step 504. If the port management window option is enabled in step 504, the port manager 125/225 displays the port management window in step 516. The port management window allows the administrator to select which ports are to be used by the application 131/231 when there is a conflict. The port manager 125/225 waits in step 518 to see if the administrator has provided input (e.g., completed administration of communication ports for the application 131/231). Once the administrator has provided input in step 518, the port manager 125/225 sends a message to the firewall 123/223 to configure the communication ports according the input from step 518. The process then goes to step 316 or 416.

If the port management window option is not enabled in step 504, the port manager 125/225 automatically determines which communication ports will be used by the application 131/231 in step 506. The port manager 125/225 can automatically determine the communication ports in various ways. For example, the communication ports can be assigned contiguously based on the first available port range that covers the total number of ports needed. The communication ports can be assigned based a first available range or a last available range. The communication ports can be assigned by just finding the first closed ports. The auto selection of ports can take into account reserved ranges, such as those that are reserved for specific protocols/application 131/231 or port ranges (or individual ports) that have been blocked out by an administrator. Once the communication ports are automatically determined in step 506, the port manager 125/225 sends a message to the firewall 123/223 to configure the communication ports in step 520. The process then goes to step 316 or 416.

If the auto configure option is enabled in step 502, the port manager 125/225 determines the communication ports for auto configure. Determination of which communication ports to auto configure in step 508 may be accomplished in the same manner as previously described in step 506. The port manager 125/225 displays an auto configuration window to the administrator in step 510. The auto configuration window displays the auto configuration information (which communication ports have been selected for the application 131 or for the application 231 installed on each server 240 of the cluster of servers 240A-240N) along with an option for the administrator to accept the auto configuration or to not select the auto configuration. If the administrator selects to not do the auto configuration in step 512, the process goes to step 516 where the port management window is displayed and flows through steps 518, and 520 as discussed previously. If the administrator selects to do the auto configuration in step 512, the process goes to step 520 where the port manager 125/225 sends a message to configure the communication ports based on the determined ports for the auto configure. The process then goes to step 316 or 416.

Figure 6:
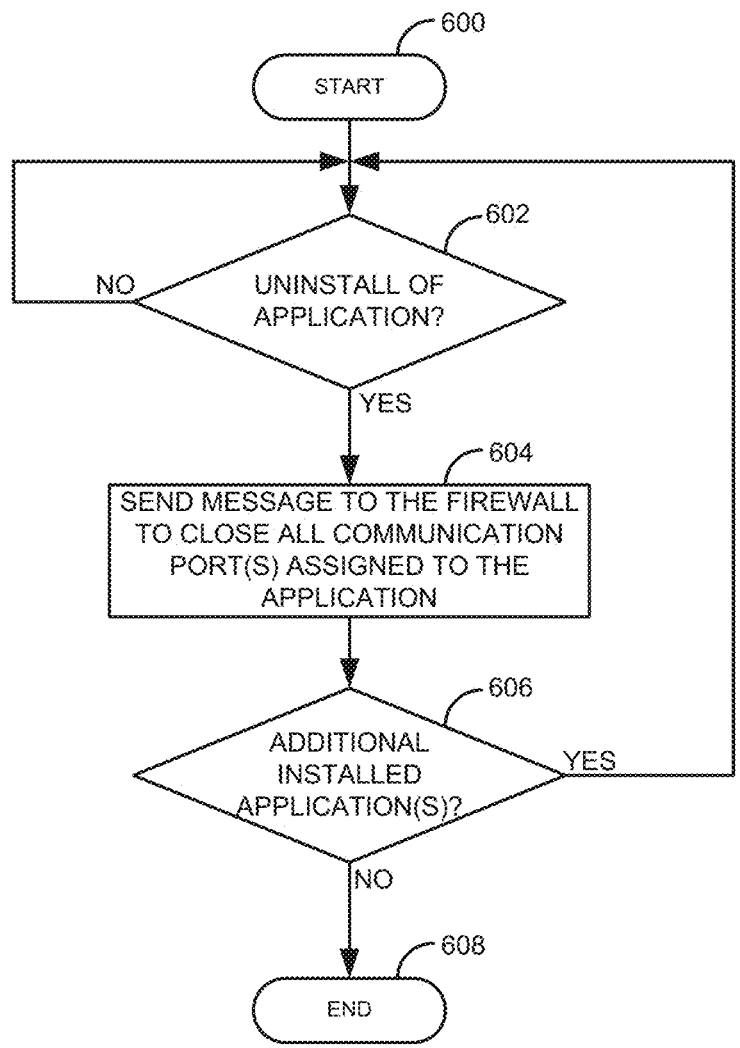
FIG. 6 is a flow diagram of a process for closing communication ports when an application is uninstalled.

FIG. 6 is a flow diagram of a process for closing communication ports when an application 131/231 is uninstalled. The process starts in step 600. For example, the process of 600 may be a thread or dameon. The port manager 125/225 determines in step 602 if an application 131/231 is being uninstalled. For example, the port manager 125/225 can determine that an application 131/231 is being uninstalled based on a call to the installation API 124/224. If an application 131/231 is not being uninstalled in step 602, the process repeats step 602.

Otherwise, if the un-installation of the application 131/231 is determined in step 602, the port manager 125/225 sends a message to the firewall 123/223 to close all ports assigned to the application 131/231 in step 604. If there is only a single application 131 the ports for the single application 131 are closed. If there are multiple instances of the application 231 and the application 231 is being uninstalled from each server 240 of the cluster of servers 240A-240N, the ports used by each instance of the application 231 are closed in step 604.

The port manager 125/225 determines in step 606 if there are any additional applications 131/231 (i.e., that have been installed, but not uninstalled). If there are additional applications 131/231, in step 606, the process goes to step 602. Otherwise, if there are not any additional applications 131/231 to be uninstalled in step 606, the process ends in step 608.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method comprising:
detecting, by a processor, installation of an application, wherein the processor is in a communication system;
receiving, from an installation program, a parameter that defines how to handle at least one port control option;
receiving, by the processor, one or more communication ports to be used by the application;
receiving, from a firewall, a list of communication ports that are currently open in the firewall, wherein the firewall is in a first communication device;
comparing, by the processor, the list of communication ports that are currently open in the firewall to the one or more communication ports to be used by the application to find a conflict;
in response to finding the conflict, implementing the at least one port control option;
in response to not finding the conflict, sending a first message to the firewall, wherein the first message causes the firewall to automatically open the one or more communication ports for the application to allow a second communication device to access the application on a computer network behind the firewall;
detecting an uninstall of the application, wherein uninstalling the application is to remove the application from the communication system; and
in response to detecting the uninstall of the application, sending a second message to the firewall, wherein the second message causes the firewall to automatically close the one or more communication ports for the application.

2. The method of claim 1, wherein the at least one port control option that is implemented in response to finding the conflict is to render for display a port management window to allow a user to change the list of one or more communication ports and/or the list of communication ports currently in use.

3. The method of claim 2, wherein the port management window allows a user to manage communication ports for a plurality of servers in a cluster.

4. The method of claim 1, wherein the at least one port control option that is implemented in response to finding the conflict is to render for display an auto configuration option window that allows a user to automatically implement the at least one port control option.

5. The method of claim 1, wherein the conflict is where at least one of the one or more communication ports are already in use by another application and wherein the at least one port control option is to automatically select at least one different communication port that is open to resolve the conflict for the one or more communication ports to be used by the application.

6. The method of claim 5, wherein automatically selecting the at least one different communication port that is open to resolve the conflict for the one or more communication ports to be used by the application is based on a list of the one or more communication ports received from an installation program via an Application Programming Interface (API).

7. The method of claim 1, wherein the conflict is where at least one of the one or more communication ports is already in use by another application and wherein the at least one port control option is to automatically resolve the conflict by at least one of: selecting an additional communication port that is open in the firewall, opening a closed communication port in the firewall, or opening an unused communication port in the firewall.

8. The method of claim 7, wherein automatically resolving the conflict is opening the closed communication port in the firewall.

9. The method of claim 7, wherein automatically resolving the conflict is selecting the additional communication port that is open in the firewall.

10. The method of claim 7, wherein automatically resolving the conflict is opening the unused communication port in the firewall.

11. The method of claim 1, wherein the conflict is where at least one of the one or more communication ports is already in use by another application and wherein the at least one port control option is to automatically assign the at least one of the one or more communication ports to a first available communication port range that covers a total number of communication ports needed, wherein the first available communication port range comprises a plurality of ports.

12. The method of claim 1, wherein the conflict is where at least one of the one or more communication ports is already in use by another application and wherein the at least one port control option is to automatically assign the at least one of the one or more communication ports to be used by the application by taking into account a reserved communication port range, wherein the reserved communication port range comprises a plurality of ports.

13. A computer system comprising:
a hardware microprocessor; and
a computer readable medium, coupled with the microprocessor and comprising microprocessor readable and executable instructions that cause the hardware microprocessor to:
detect installation of an application;
receive, from an installation program, a parameter that defines how to handle at least one port control option;
receive one or more communication ports to be used by the application;
receive, from a firewall, a list of communication ports that are currently open in the firewall, wherein the firewall is in a first communication device;
compare the list of communication ports that are currently open in the firewall to the one or more communication ports to be used by the application to find a conflict;
in response to finding the conflict, implement the at least one port control option;
in response to not finding the conflict, send a first message to the firewall, wherein the first message causes the firewall to automatically open the one or more communication ports for the application to allow a second communication device to access the application on a computer network behind the firewall;
detect an uninstall of the application, wherein uninstalling the application is to remove the application from the communication system; and
send a second message to the firewall, wherein the second message causes the firewall to automatically close the one or more communication ports for the application in response to detecting the uninstall of the application.

14. The system of claim 13, wherein the at least one port control option that is implemented in response to finding the conflict is to render for display a port management window to allow a user to change the list of one or more communication ports and/or the list of communication ports currently in use.

15. The system of claim 14, wherein the port management window allows a user to manage communication ports for a plurality of servers in a cluster.

16. The system of claim 13, wherein the at least one port control option that is implemented in response to finding the conflict is to render for display an auto configuration option window that allows a user to automatically implement the at least one port control option.

17. The system of claim 13, wherein the conflict is where at least one of the one or more communication ports are already in use by another application and wherein the at least one port control option is to automatically select at least one different communication port that is open to resolve the conflict for the one or more communication ports to be used by the application.

18. The system of claim 17, wherein automatically selecting the at least one different communication port that is open to resolve the conflict for the one or more communication ports to be used by the application is based on a list of one or more communication ports received from an installation program via an Application Programming Interface (API).

19. A computer system comprising:
a hardware microprocessor; and
a computer readable medium, coupled with the microprocessor and comprising microprocessor readable and executable instructions that cause the hardware microprocessor to:
detect installation of an application;
receive one or more communication ports to be used by the application;
receive, from a firewall, a list of communication ports that are currently open in the firewall, wherein the firewall is in a first communication device;
compare the list of communication ports that are currently open in the firewall to the one or more communication ports to be used by the application to find a conflict, wherein the conflict is where at least one of the one or more communication ports is already in use by another application;
in response to finding the conflict, implement at least one port control option, wherein the at least one port control option is to automatically assign the at least one of the one or more communication ports: 1) to a first available communication port range that covers a total number of communication ports needed, wherein the first available communication port range comprises a plurality of ports; or 2) to be used by the application by taking into account a reserved communication port range, wherein the reserved communication port range comprises a plurality of ports;

in response to not finding the conflict, send a first message to the firewall, wherein the first message causes the firewall to automatically open the one or more communication ports for the application to allow a second communication device to access the application on a computer network behind the firewall;

detect an uninstall of the application, wherein uninstalling the application is to remove the application from the communication system; and send a second message to the firewall, wherein the second message causes the firewall to automatically close the one or more communication ports for the application in response to detecting the uninstall of the application.

20. The computer system of claim 19, wherein the at least one port control option is to automatically assign the at least one of the one or more communication ports to the first available communication port range that covers the total number of communication ports need.

* * * * *